(12) United States Patent
Hsu et al.

(10) Patent No.: US 8,596,660 B2
(45) Date of Patent: Dec. 3, 2013

(54) THREE-WHEELED MOTOR VEHICLE WITH HIGH SAFETY

(75) Inventors: Mau-Pin Hsu, Taipei (TW); Hsin-Wei Su, New Taipei (TW); Chih-Hao Wang, Yunlin County (TW)

(73) Assignee: National Taiwan University of Science and Technology, Taipei (TW)

( * ) Notice: Subject to any disclaimer, the term of this patent is extended or adjusted under 35 U.S.C. 154(b) by 53 days.

(21) Appl. No.: 13/352,356

(22) Filed: Jan. 18, 2012

(65) Prior Publication Data

US 2013/0181420 A1 Jul. 18, 2013

(51) Int. Cl.
*B60K 5/02* (2006.01)
*B60K 5/04* (2006.01)

(52) U.S. Cl.
USPC ................ 280/124.103; 280/5.509; 280/755; 280/6.154; 180/210

(58) Field of Classification Search
USPC ........... 280/755, 124.103, 6.15, 6.154, 5.509, 280/5.508; 180/210, 211, 213, 214
See application file for complete search history.

(56) References Cited

U.S. PATENT DOCUMENTS

| | | | | |
|---|---|---|---|---|
| 4,351,410 A * | 9/1982 | Townsend | ...................... | 180/210 |
| 4,740,004 A * | 4/1988 | McMullen | ..................... | 280/269 |
| 4,974,863 A * | 12/1990 | Patin | ............................... | 280/62 |
| 5,040,812 A * | 8/1991 | Patin | ............................... | 280/62 |
| 5,762,351 A * | 6/1998 | SooHoo | ......................... | 280/267 |
| 6,367,824 B1 * | 4/2002 | Hayashi | .......................... | 280/62 |
| 7,264,251 B2 * | 9/2007 | Marcacci | ................ | 280/124.103 |
| 8,141,890 B2 * | 3/2012 | Hughes et al. | ......... | 280/124.103 |
| 2007/0126199 A1 * | 6/2007 | Peng et al. | .............. | 280/124.103 |
| 2007/0262549 A1 * | 11/2007 | Haerr et al. | ............. | 280/124.103 |
| 2008/0238005 A1 * | 10/2008 | James | ......................... | 280/5.509 |
| 2012/0098225 A1 * | 4/2012 | Lucas | .................... | 280/124.103 |
| 2013/0001001 A1 * | 1/2013 | Hsu et al. | ....................... | 180/210 |

FOREIGN PATENT DOCUMENTS

| | | |
|---|---|---|
| CN | 1386668 | 12/2002 |
| CN | 201151444 | 11/2008 |
| TW | 327868 | 3/1998 |
| TW | 446660 | 7/2001 |
| TW | 495460 | 7/2002 |
| TW | 200815232 | 4/2008 |

OTHER PUBLICATIONS

"Office Action of Taiwan Counterpart Application", issued on Dec. 19, 2012, p. 1-p. 6, in which the listed references were cited.

* cited by examiner

*Primary Examiner* — Ruth Ilan
(74) *Attorney, Agent, or Firm* — Jianq Chyun IP Office

(57) ABSTRACT

A three-wheeled motor vehicle includes a main body, two shafts, two wheel bases, a blocking structure fixed to the main body and a linkage module. Each shaft has first, second and third pivot points. The third pivot point between the first and second pivot points is pivoted to the main body. One wheel base is pivoted to the first pivot points. The other wheel base is pivoted to the second pivot points. The wheel bases and the shafts form a parallelogram four bar mechanism. The linkage module is coupled between the main body and the parallelogram four bar mechanism. When the main body tilts as the three-wheeled motor vehicle turning, the linkage module changes from a first state to a second state to drive the wheel bases to tilt.
The linkage module in the second state leans against the blocking structure to limit the tilt range of the wheel bases.

9 Claims, 4 Drawing Sheets

THREE-WHEELED MOTOR VEHICLE WITH HIGH SAFETY

BACKGROUND OF THE INVENTION

1. Field of the Invention

The present invention relates to a motor vehicle, and more particularly to a three-wheeled motor vehicle.

2. Description of Related Art

A motor vehicle, such as a common two-wheeled motor vehicle or a three-wheeled motor vehicle for the handicapped, is a vehicle driven by fuel or electric power. A common two-wheeled motor vehicle is highly vulnerable to dangers of slipping when turning on a slippery or gravel pavement, while like a freight truck or a tourist coach, the three-wheeled motor vehicle is also highly vulnerable to dangers of overturning toward outside during high-speed cornering or emergent avoidance.

Generally speaking, it is unreliable and difficult to prevent the dangers of slipping or overturning through experience and techniques of a driver. Due to different personal driving habits and experience, reactions to different and unfamiliar pavements are also different, and therefore, car accidents owing to the aforementioned reasons happen from time to time, which, at the same time, cause the loss of life and property of many families.

In view of this, some motor vehicles uses a large amount of complex electronic sensors and actuators to improve controllability, so as to solve the aforementioned problems. However, this kind of motor vehicles are expensive and likely to have faults, and therefore can only become a luxury toy of the rich and fail to truly become an assistive tool that brings welfare to people's livelihood and benefit to the handicapped group, or become affordable daily commuting vehicles.

SUMMARY OF THE INVENTION

The present invention is directed to a three-wheeled motor vehicle, which has desirable and better controllability and safety.

The present invention provides a three-wheeled motor vehicle, which includes a main body, two shafts, two wheel bases, two rear wheels, a blocking structure and a linkage module. Each shaft has a first pivot point, a second pivot point and a third pivot point placed between the first pivot point and second pivot point, in which the third pivot points of the shafts are both pivoted to the main body. One wheel base is pivoted to the two first pivot points, and the other wheel base is pivoted to the two second pivot points, such that the two wheel bases and the two shafts form a parallelogram four bar mechanism. The two rear wheels are respectively pivoted to the two wheel bases. The blocking structure is fixed to the main body. The linkage module is coupled between the main body and the parallelogram four bar mechanism, in which when the main body tilts as the three-wheeled motor vehicle turning, the linkage module changes from a first state to a second state relative to the main body, thereby drive the two wheel bases to tilt through the parallelogram four bar mechanism. The linkage module leans against the blocking structure in the second state, so as to limit the tilt range of the two wheel bases.

In an embodiment of the present invention, the two shafts substantially parallel to each other along a horizontal direction are pivoted to the main body and the two wheel bases. The projection shape of the two first pivot points, the two second pivot points and the two third pivot points on a plane vertical to the horizontal direction is defined as a rectangle. The projection position of the two first pivot points and the two second pivot points on the plane are at four vertexes of the rectangle, and the projection position of the two third pivot points on the plane are respectively located on two opposite side lines of the rectangle.

In an embodiment of the present invention, the linkage module includes two first link bars, two second link bars and two third link bars. The two first link bars are both pivoted to one shaft at one end thereof and are respectively located on either sides of the third pivot point, in which a fourth pivot point is provided at the other end of each first link bar away from the shaft. The two second link bars are both pivoted to the main body at one end thereof and are respectively pivoted to the two fourth pivot points at the other end thereof. The two third link bars are both pivoted to each other at one end thereof and are respectively pivoted to the two fourth pivot points at the other end thereof In an embodiment of the present invention, the blocking structure has a sliding groove and a sliding block capable of sliding in the sliding groove, and the two third link bars are both pivoted to the sliding block, and the sliding block leans against an end of the sliding groove as the linkage module is in the second state.

In an embodiment of the present invention, each shaft includes a first horizontal bar and a second horizontal bar. The first pivot point is located on one end of the first horizontal bar. The second pivot point is located on one end of the second horizontal bar, and the other end of the first horizontal bar is pivoted to the other end of the second horizontal bar. The third pivot point is pivoted on a position where the first horizontal bar and the second horizontal bar are pivoted to each other.

In an embodiment of the present invention, the blocking structure includes two stoppers. The stoppers do not constrain movement of the linkage module as the linkage module is in the first state, and one second link bar leans against one stopper as the linkage module is in the second state.

In an embodiment of the present invention, each stopper has a stopping surface for leaning against the corresponding second link bar. The three-wheeled motor vehicle may further include two motors, respectively connected to the two stoppers, to drive the corresponding stopper to rotate and change the angle of the stopping surface, so as to adjust the action range of the corresponding second link bar.

In an embodiment of the present invention, the three-wheeled motor vehicle further includes a fourth link bar, in which the fourth link bar is pivoted to a pivoted point where the two third link bars are pivoted to each other at one end, and pivoted to the main body at the other end.

In an embodiment of the present invention, the three-wheeled motor vehicle further includes a front wheel pivoted to a front end of the main body.

Based on the above, the three-wheeled motor vehicle according to the present invention may limit the action of the linkage module through the blocking structure, so as to control the tilt range of the two wheel bases. In this way, the three-wheeled motor vehicle is prevented from dangers of overturning inwardly due to excessive tilting of the wheel bases and the main body during cornering or passing pavements of bad conditions.

In order to make the aforementioned features and advantages of the present invention comprehensible, embodiments are described in details below with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
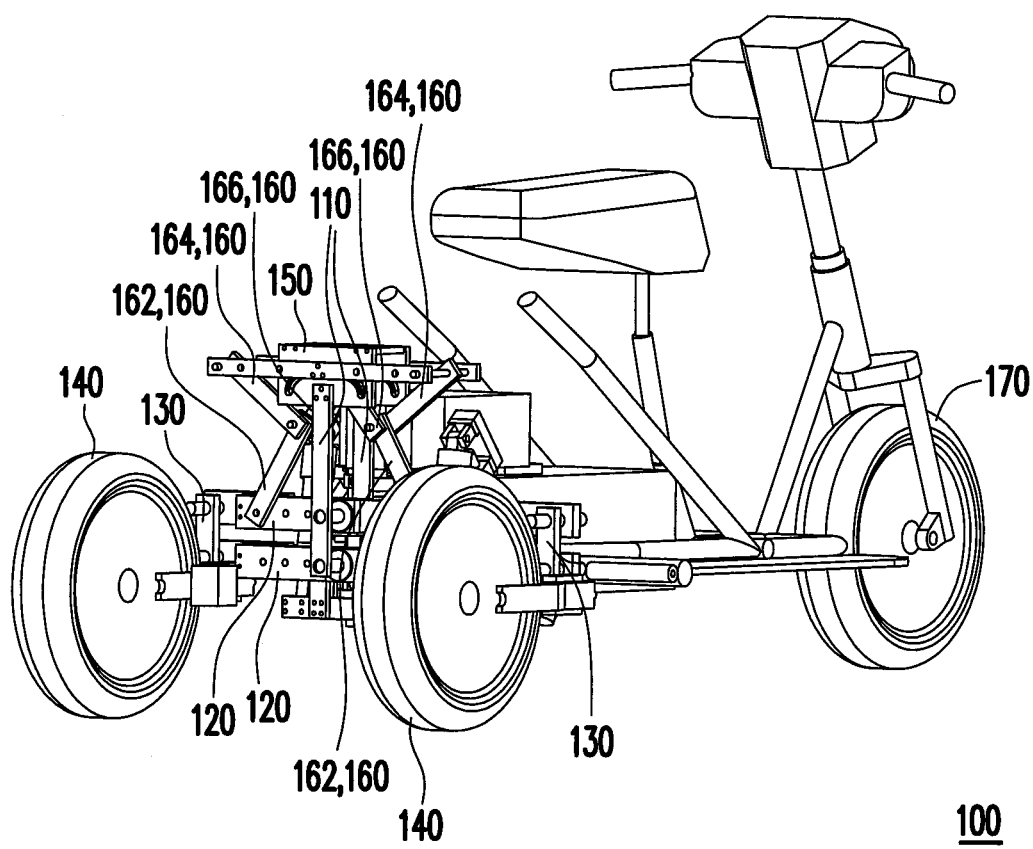
FIG. 1 is a three-dimensional view of a three-wheeled motor vehicle according to an embodiment of the present invention.

Reference will now be made in details to the present embodiments of the invention, examples of which are illustrated in the accompanying drawings. Wherever possible, the same reference numbers are used in the drawings and the description to refer to the same or like parts.

Figure 2A:
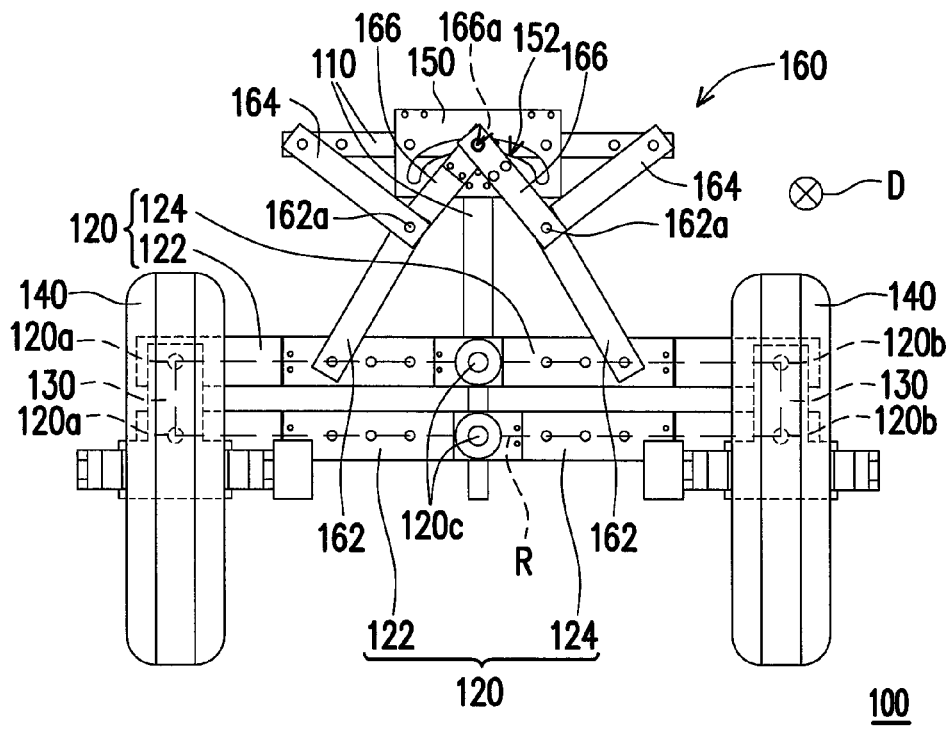
FIG. 2A and FIG. 2B are flow charts of actions of a part of components of the three-wheeled motor vehicle of FIG. 1.
Figure 2B:
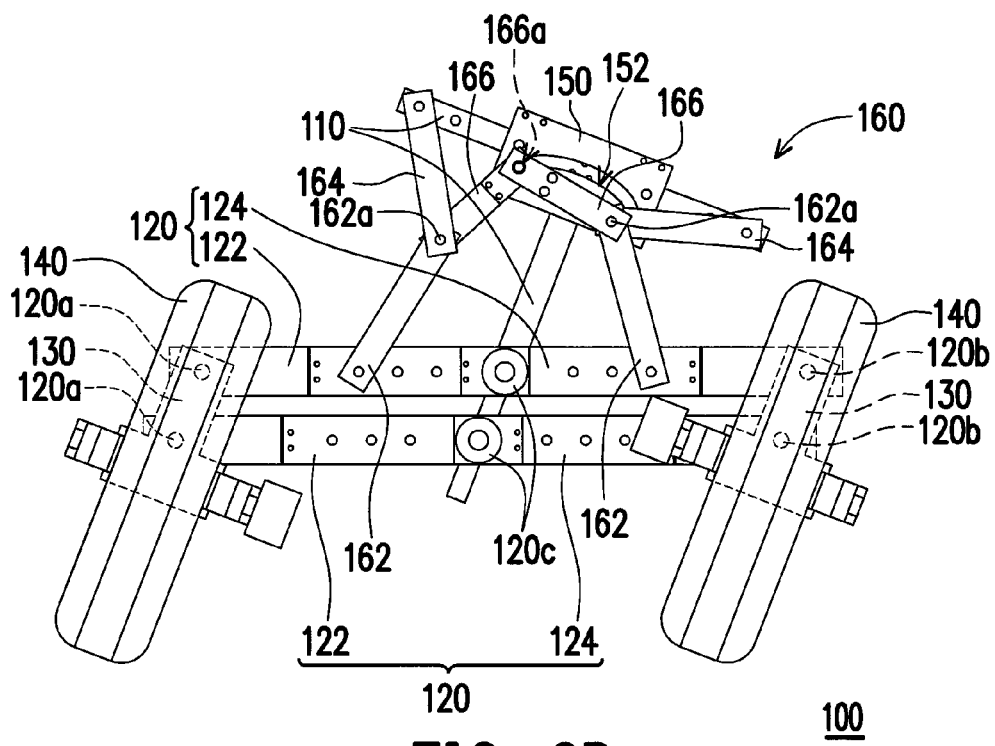

FIG. 1 is a three-dimensional view of a three-wheeled motor vehicle according to an embodiment of the present invention. FIG. 2A and FIG. 2B are flow charts of actions of a part of components of the three-wheeled motor vehicle of FIG. 1. Referring to FIG. 1 and FIG. 2A, the three-wheeled motor vehicle 100 of this embodiment includes a main body 110, two shafts 120, two wheel bases 130, two rear wheels 140, a blocking structure 150, a linkage module 160 and a front wheel 170. Each shaft 120 has a first pivot point 120a, a second pivot point 120b and a third pivot point 120c placed between the first pivot point 120a and the second pivot point 120b.

The third pivot points 120c of the shafts 120 are both pivoted to the main body 110. One wheel base 130 is pivoted to the two first pivot points 120a, and the other wheel base 130 is pivoted to the two second pivot points 120b, such that the two wheel bases 130 and the two shafts 120 may form a parallelogram four bar mechanism, thereby enabling the main body 110 and the wheel bases 130 to tilt through an action of the parallelogram four bar mechanism. The two rear wheels 140 are respectively pivoted to the two wheel bases 130. The blocking structure 150 is fixed to the main body 110. The linkage module 160 is coupled between the main body 110 and the parallelogram four bar mechanism. The front wheel 170 is pivoted to a front end of the main body 110.

The linkage module 160 is applicable to an action from a state shown in FIG. 2A to a state shown in FIG. 2B relative to the main body 110, and drives the two wheel bases 130 to tilt through the parallelogram four bar mechanism. The linkage module 160 leans against the blocking structure 150 while being in the state shown in FIG. 2B, so as to limit the tilt range of the two wheel bases 130. In this manner, the three-wheeled motor vehicle 100 of this embodiment may limit the action of the linkage module 160 through the blocking structure 150, so as to control the tilt range of the two wheel bases 130, and therefore the three-wheeled motor vehicle 100 is prevented from dangers of overturning inwardly (or slipping down, or lowside) due to excessive tilting of the wheel bases 130 and the main body 110 during cornering or passing pavements of bad conditions. It should be noted that, FIG. 2B shows a status of the main body 110 and the wheel bases 130 tilting to the right. The main body 110 and the wheel bases 130 may also tilt to the left driven by the linkage module 160, and an action manner of tilting to the left is similar to that of tilting to the right shown in FIG. 2B, and therefore details are not described herein again.

Specifically, the two shafts 120 of this embodiment are substantially parallel to each other along a horizontal direction D (a direction pointing into a paper principal plane) and are pivoted to the main body 110 and the two wheel bases 130. The projection shape of the two first pivot points 120a, the two second pivot points 120b and the two third pivot points 120c on a plane vertical to the horizontal direction D is defined as a rectangle R. The projection position of the two first pivot points 120a and the two second pivot points 120b on the plane are at four vertexes of the rectangle R, and the projection position of the two third pivot points 120c on the plane are respectively located on two opposite side lines of the rectangle R, such that the two wheel bases 130 and the two shafts 120 form the parallelogram four bar mechanism.

In this embodiment, the linkage module 160 includes two first link bars 162, two second link bars 164 and two third link bars 166. The two first link bars 162 are both pivoted to the shaft 120 at one end thereof and are respectively located on either sides of the third pivot point 120c, in which a fourth pivot point 162a is provided at the other end of each first link bar 162 away from the shaft 120. The two second link bars 164 are both pivoted to the main body 110 at one end thereof and are respectively pivoted to the two fourth pivot points 162a at the other end thereof. The two third link bars 166 are both pivoted to each other at one end thereof and respectively pivoted to the two fourth pivot points 162a at the other end thereof, so as to achieve the action manner of FIG. 2A to FIG. 2B.

In this embodiment, the blocking structure 150 has a sliding groove 152 and a sliding block 166a capable of sliding in the sliding groove 150, and the two third link bars 166 are both pivoted to the sliding block 166a, and the sliding block 166a leans against an end of the sliding groove 152 as the linkage module 160 is in the state shown in FIG. 2B, so as to limit the action range of the linkage module 160 and the tilt range of the two wheel bases 130 and the two rear wheels 140.

More specifically, each shaft 120 in this embodiment may be formed by a first horizontal bar 122 and a second horizontal bar 124 pivoted to each other. The first pivot point 120a is located on one end of the first horizontal bar 122. The second pivot point 120b is located on one end of the second horizontal bar 124. The other end of the first horizontal bar 122 is pivoted to the other end of the second horizontal bar 124, and the third pivot point 120c is provided at a position where the first horizontal bar 122 and the second horizontal bar 124 are pivoted to each other. The shape of the sliding groove 152 may be designed through calculation, such that the linkage module 160 acts between the state shown in FIG. 2A and the state shown in FIG. 2B. The sliding groove 152 is applicable to limiting the action manner of the linkage module 160, so as to prevent relative rotation of the first horizontal bar 122 and the second horizontal bar 124, thereby ensuring that the two shafts 120 and the two wheel bases 130 act in a four-bar linkage manner.

Figure 3A:
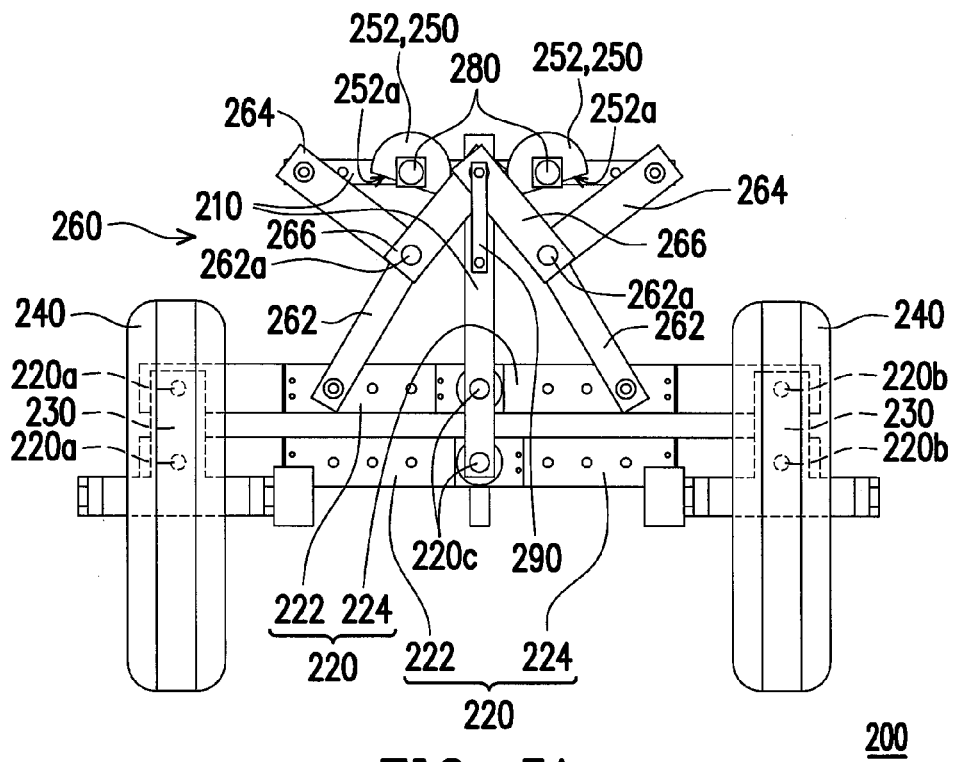
FIG. 3A and FIG. 3B are flow charts of actions of a part of components of a three-wheeled motor vehicle according to another embodiment of the present invention.
Figure 3B:
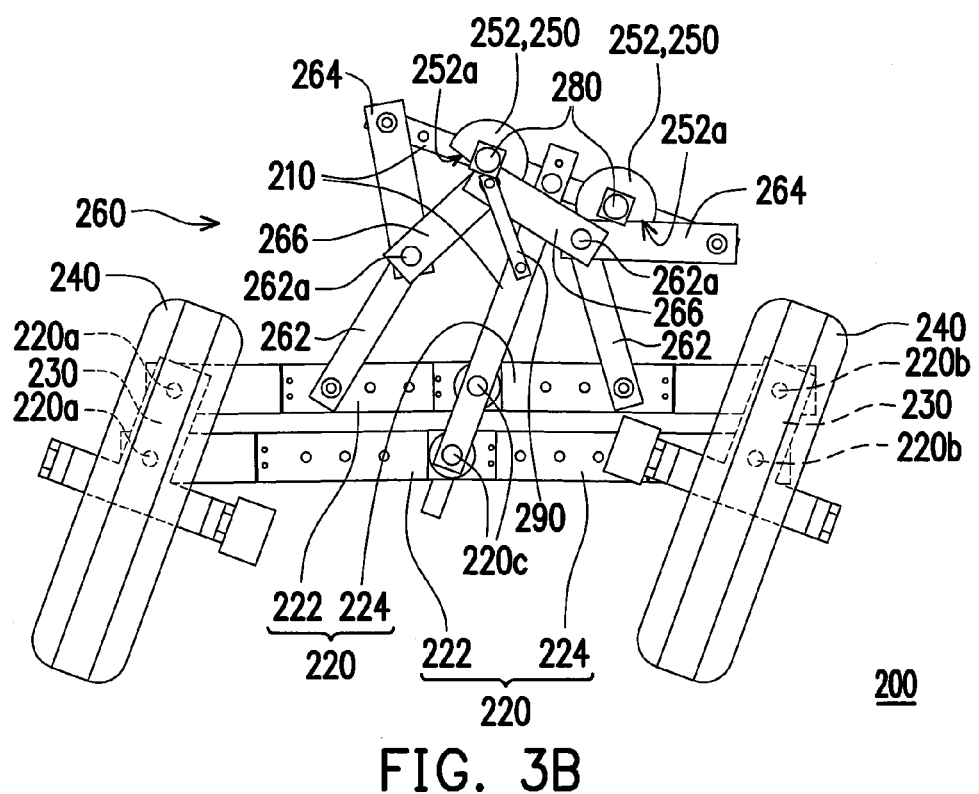

FIG. 3A and FIG. 3B are flow charts of actions of a part of components of a three-wheeled motor vehicle according to another embodiment of the present invention.

Referring to FIG. 3A and FIG. 3B, in this embodiment, a blocking structure 250 includes two stoppers 252, and a linkage module 260 includes two first link bars 262, two second link bars 264 and two third link bars 266. The two first link bars 262 are both pivoted to a shaft 220 and are respectively located on two sides of a third pivot point 220c, in which one end of each first link bar 262 away from the shaft 220 has a fourth pivot point 262a. The two second link bars 264 are both pivoted to a main body 210 and are respectively pivoted to the two fourth pivot points 262a. The two third link bars 266 are pivoted to each other and respectively pivoted to the two fourth pivot points 262a. so as to achieve an action manner of FIG. 3A to FIG. 3B. The stoppers 252 do not constrain movement of the linkage module 260 as the linkage module 260 is in a state shown in FIG. 3A. One second link bar 264 leans against the corresponding stopper 252 as the linkage module 260 is in a state shown in FIG. 3B, so as to limit the action range of the linkage module 260 and the tilt range of the two wheel bases 230 and the two rear wheels 240, thereby preventing the main body 210 from overturning inwardly during high-speed cornering or passing pavements of bad conditions at high speeds.

Figure 4:
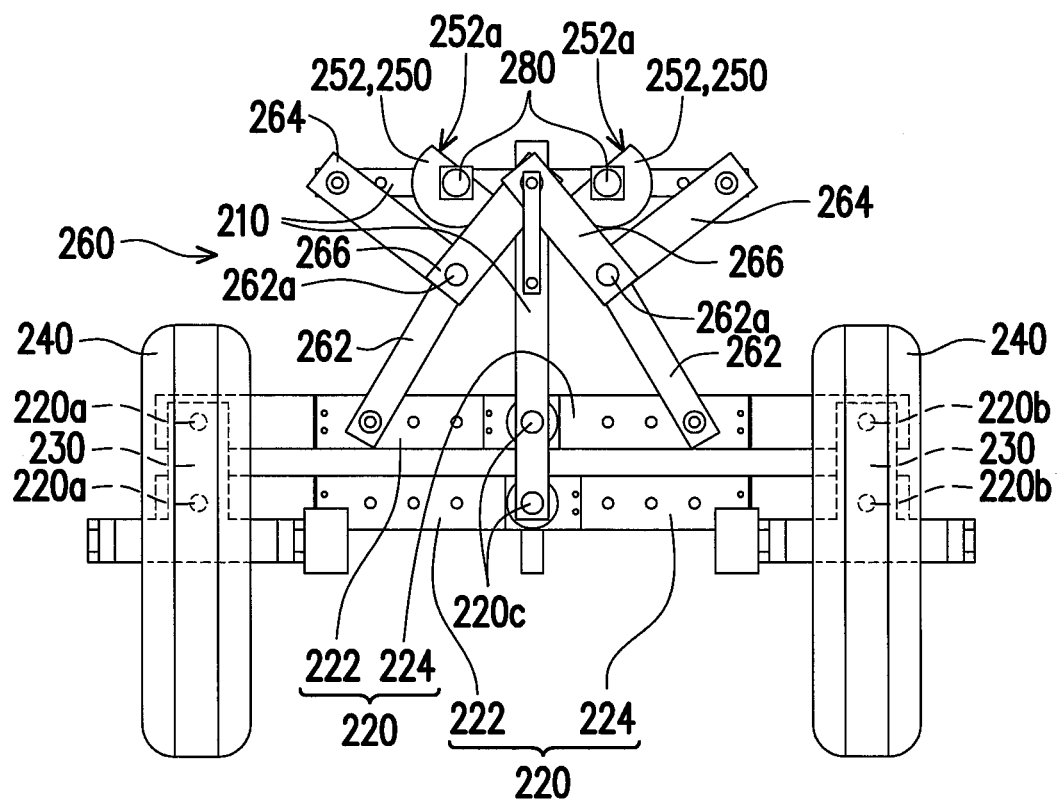
FIG. 4 is a schematic view of a motor driving a stopper to rotate of FIG. 3A.

FIG. 4 is a schematic view of a motor driving a stopper to rotate of FIG. 3A. Referring to FIG. 3A and FIG. 4, specifically, each stopper 252 has a stopping surface 252a for leaning against the corresponding second link bar 264. The three-wheeled motor vehicle 200 further includes two motors 280 respectively connected to the two stoppers 252. Each motor 280 is applicable to driving the corresponding stopper 252 to rotate to change an angle of the stopping surface 252a (as shown in FIG. 4), so as to adjust the action range of the corresponding second link bar 264. For example, when the three-wheeled motor vehicle 200 travels at a high speed, the stopping surface 252a of the stopper 252 is driven by the motor 280 and rotates to a position shown in FIG. 3A. Here, the action range of the second link bar 264 is large, which is applicable to a general driving status, while when the three-wheeled motor vehicle 200 runs with a low speed, the angle of the stopping surface 252a may be changed by driving the motor 280 (as shown in FIG. 4), such that the action of the second link bar 264 is limited to a very small range, thereby improving the stability at low speeds.

In this embodiment, the three-wheeled motor vehicle 200 further includes a fourth link bar 290, in which the fourth link bar 290 is pivoted at a pivoted point where the two third link bars 266 are pivoted to each other at one end, and pivoted to the main body 210 at the other end. Each shaft 220 in this embodiment may be formed by a first horizontal bar 222 and a second horizontal bar 224 pivoted to each other. The first pivot point 220a is located on one end of the first horizontal bar 222. The second pivot point 220b is located at one end of the second horizontal bar 224. The other end of the first horizontal bar 222 is pivoted to the other end of the second horizontal bar 224, and the third pivot point 220c is located at a position where the first horizontal bar 222 and the second horizontal bar 224 are pivoted. The length of the fourth link bar 290 may be designed through calculation, such that the linkage module 260 acts between the state shown in FIG. 3A and the state shown in FIG. 3B. The fourth link bar 290 is applicable to limiting the action manner of the linkage module 260, so as to prevent relative rotation of the first horizontal bar 222 and the second horizontal bar 224, thereby ensuring that the two shafts 220 and the two wheel bases 230 act in a four-bar linkage manner.

Based on the above, the three-wheeled motor vehicles according to the present invention may limit the action of the linkage module through the blocking structure, so as to control the tilt range of the two wheel bases. In this way, the three-wheeled motor vehicle is prevented from dangers of overturning inwardly due to excessive tilting of the wheel bases and the main body during cornering or passing pavements of bad conditions, and controllability and safety of the three-wheeled motor vehicles are improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three-wheeled motor vehicle, comprising:
    a main body;
    two shafts each comprising a first pivot point, a second pivot point and a third pivot point, placed between the first pivot point and the second pivot point, and the third pivot points of the shafts are both pivoted to the main body;
    two wheel bases, wherein one of the wheel bases is pivoted to the two first pivot points, and the other one of the wheel bases is pivoted to the two second pivot points, such that the two wheel bases and the two shafts form a parallelogram four bar mechanism;
    two rear wheels respectively pivoted to the two wheel bases;
    a blocking structure fixed to the main body; and
    a linkage module coupled between the main body and the parallelogram four bar mechanism, wherein when the main body tilts as the three-wheeled motor vehicle turning, the linkage module changes from a first state to a second state relative to the main body, thereby driving the two wheel bases to tilt through the parallelogram four bar mechanism, and the linkage module leans against the blocking structure in the second state, so as to limit the tilt range of the two wheel bases.

2. The three-wheeled motor vehicle according to claim 1, wherein the two shafts substantially parallel to each other along a horizontal direction are pivoted to the main body and the two wheel bases, and
    the projection shape of the two first pivot points, the two second pivot points and the third pivot points on a plane vertical to the horizontal direction is defined as a rectangle, and
    the projection position of the two first pivot points and the two second pivot points on the plane are at four vertexes of the rectangle, and
    the projection position of the two third pivot points on the plane are respectively located on two opposite side lines of the rectangle.

3. The three-wheeled motor vehicles according to claim 1, wherein the linkage module comprises:
    two first link bars, both pivoted to one of the shafts at one end thereof, respectively located on either sides of the third pivot point, wherein a fourth pivot point is provided at the other end of each first link bar away from the shaft;
    two second link bars, both pivoted to the main body at one end thereof, respectively pivoted to the two fourth pivot points at the other end thereof; and
    two third link bars, both pivoted to each other at one end thereof, respectively pivoted to the two fourth pivot points at the other end thereof.

4. The three-wheeled motor vehicle according to claim 3, wherein the blocking structure comprises a sliding groove and a sliding block capable of sliding in the sliding groove, and the two third link bars are both pivoted to the sliding block, and the sliding block leans against an end of the sliding groove as the linkage module is in the second state.

5. The three-wheeled motor vehicle according to claim 3, wherein the blocking structure comprises two stoppers, the stoppers do not constrain movement of the linkage module as the linkage module is in the first state, and one of the second link bars leans against one of the stoppers as the linkage module is in the second state.

6. The three-wheeled motor vehicle according to claim 5, wherein each stopper comprises a stopping surface for leaning against the corresponding second link bar, the three-wheeled motor vehicle further comprises two motors, respectively connected to the two stoppers, to drive the corresponding stopper to rotate and change the angle of the stopping surface, so as to adjust the action range of the corresponding second link bar.

7. The three-wheeled motor vehicle according to claim 3, further comprising a fourth link bar, wherein the fourth link bar is pivoted to a pivoted point where the two third link bars are pivoted to each other at one end, and pivoted to the main body at the other end.

8. The three-wheeled motor vehicles according to claim 1, wherein each shaft comprises:
- a first horizontal bar with the first pivot point located on one end of the first horizontal bar; and
- a second horizontal bar with the second pivot point located on one end of the second horizontal bar, and
- wherein the other end of the first horizontal bar is pivoted to the other end of the second horizontal bar, and the third pivot point is provided on a position where the first horizontal bar and the second horizontal bar are pivoted to each other.

9. The three-wheeled motor vehicle according to claim 1, further comprising a front wheel pivoted to a front end of the main body.

* * * * *